Inventor
Vladimir P. Fedoroff.
By Kenyon & Kenyon
His Attorneys

March 4, 1924.

V. P. FEDOROFF

ALARM DEVICE

Filed Feb. 17, 1920     13 Sheets-Sheet 2

1,485,498

Inventor
Vladimir P. Fedoroff
By Kenyon & Kenyon
his Attorneys

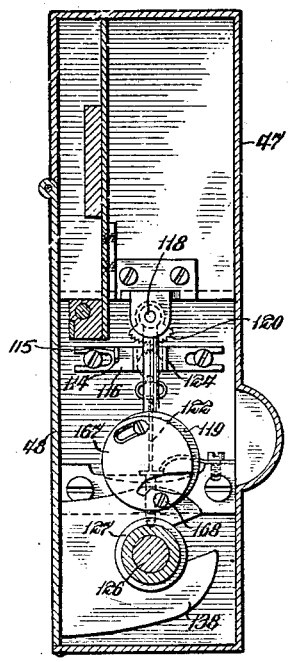
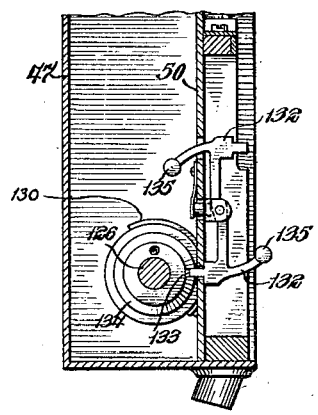
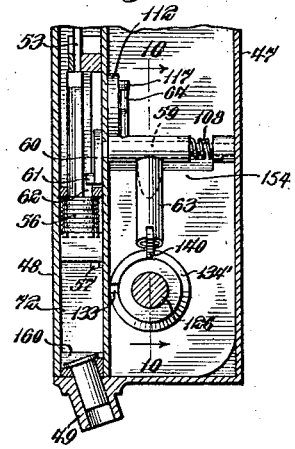
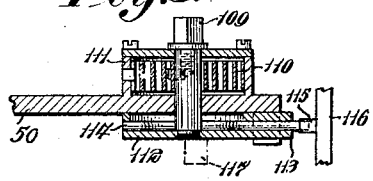
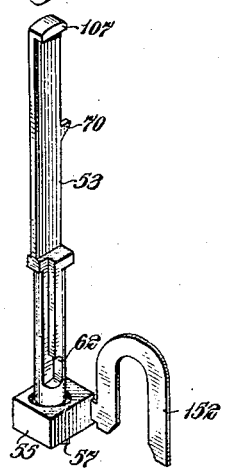
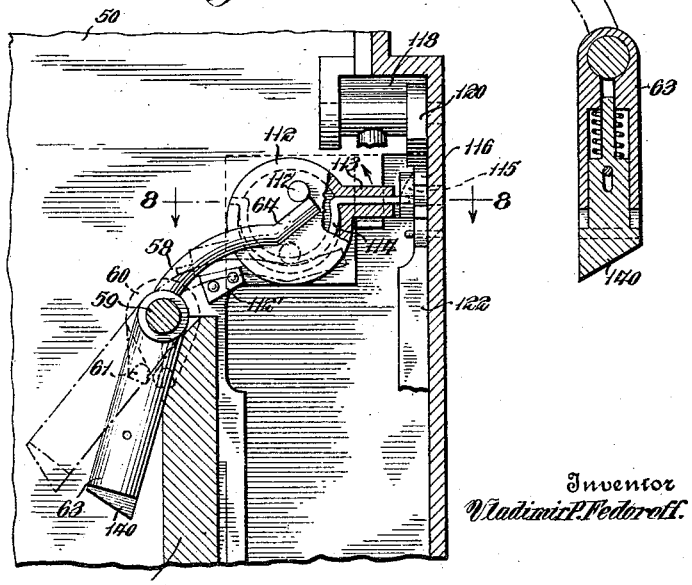

March 4, 1924. 1,485,498
V. P. FEDOROFF
ALARM DEVICE
Filed Feb. 17, 1920 13 Sheets-Sheet 4
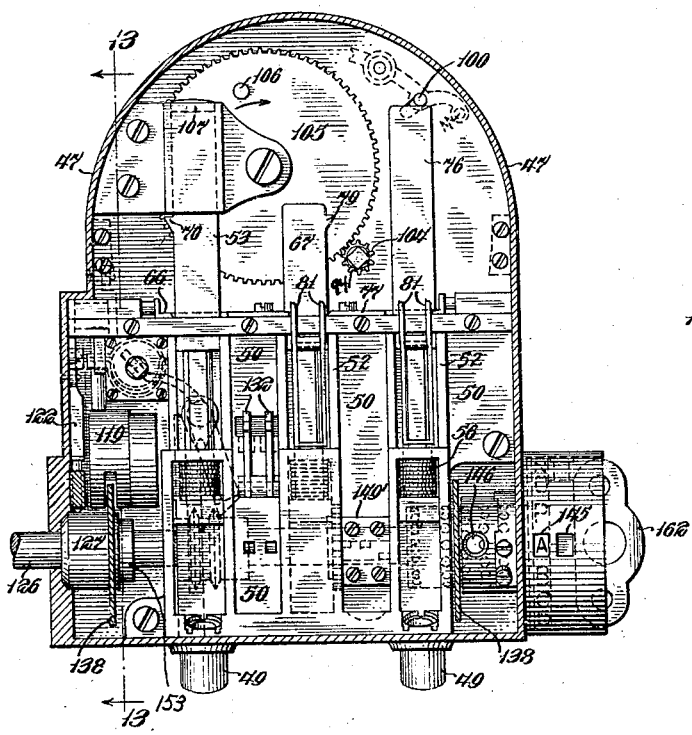
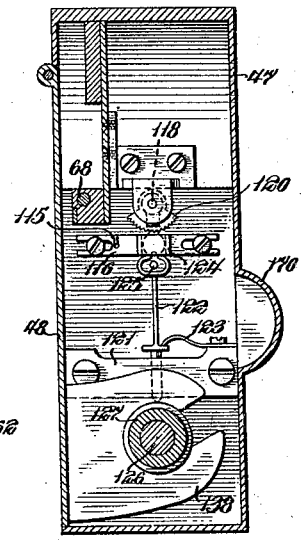
Inventor
Vladimir P. Fedoroff.
By Kenyon & Kenyon,
His Attorneys March 4, 1924.
V. P. FEDOROFF
ALARM DEVICE
Filed Feb. 17, 1920
1,485,498
13 Sheets-Sheet 5
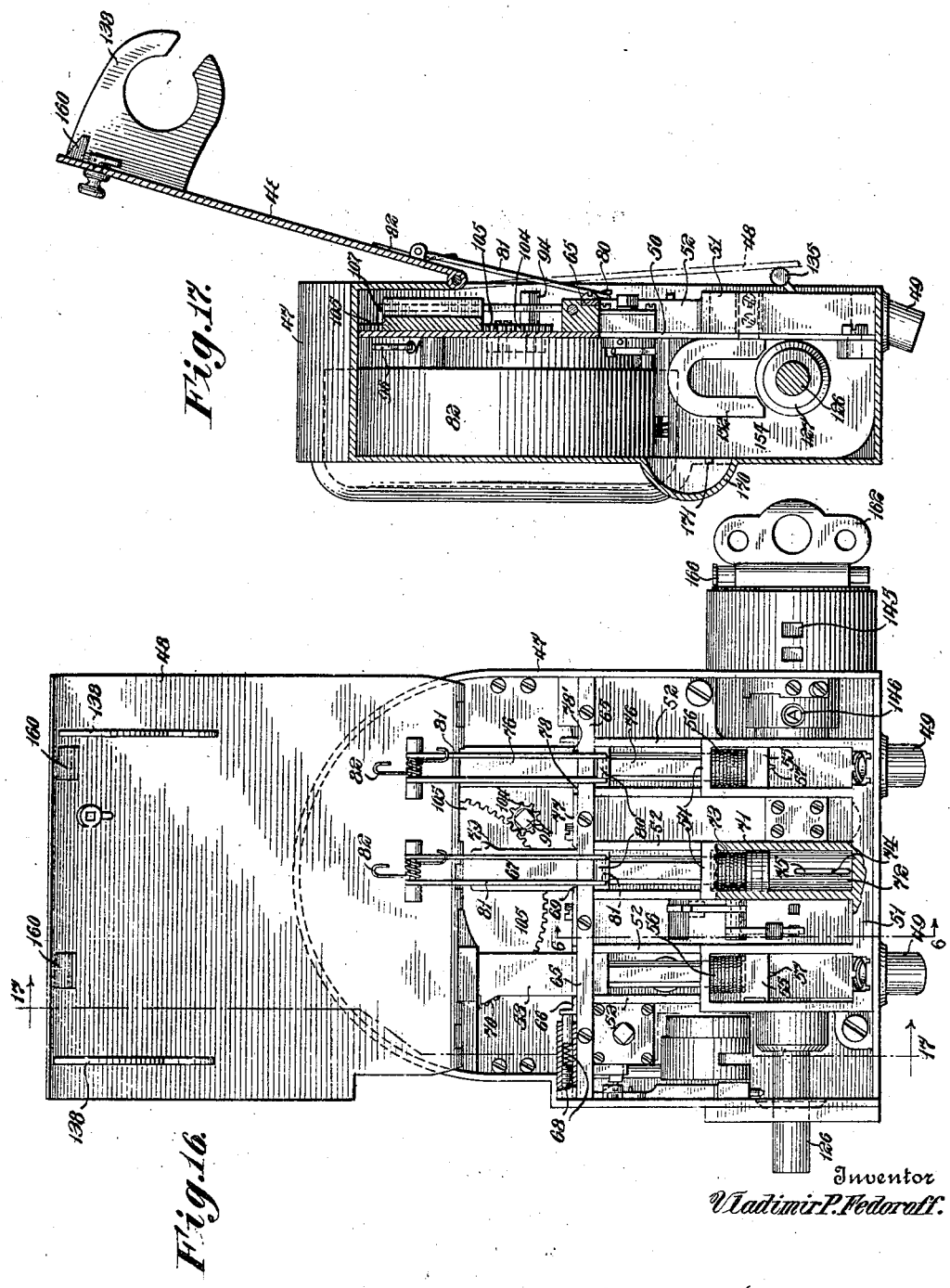
Inventor
Vladimir P. Fedoroff.
By Kenyon & Kenyon,
his Attorneys

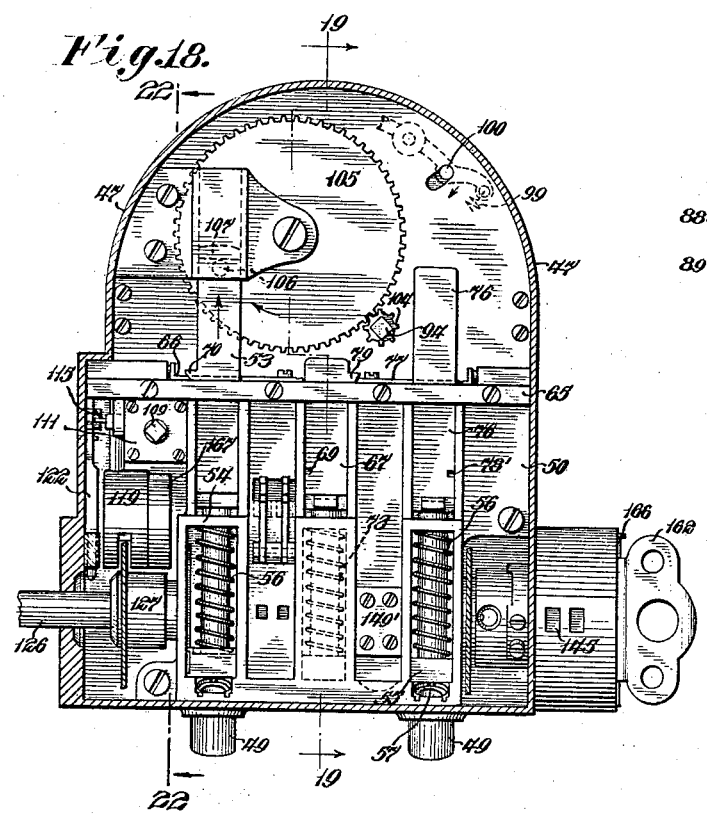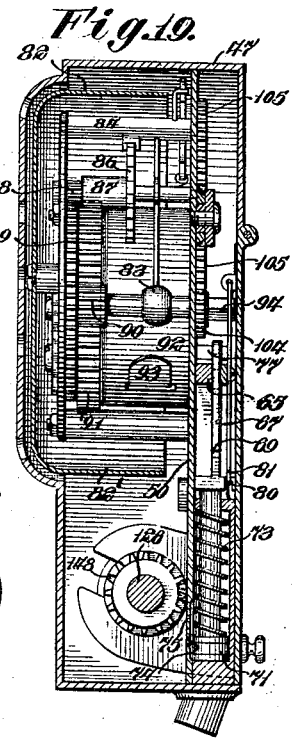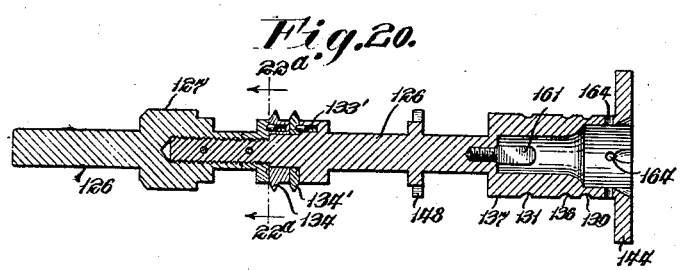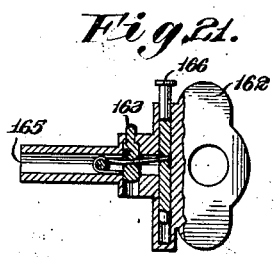

March 4, 1924.

V. P. FEDOROFF

ALARM DEVICE

Filed Feb. 17, 1920

Inventor
Vladimir P. Fedoroff.

By Kenyon & Kenyon, his Attorneys

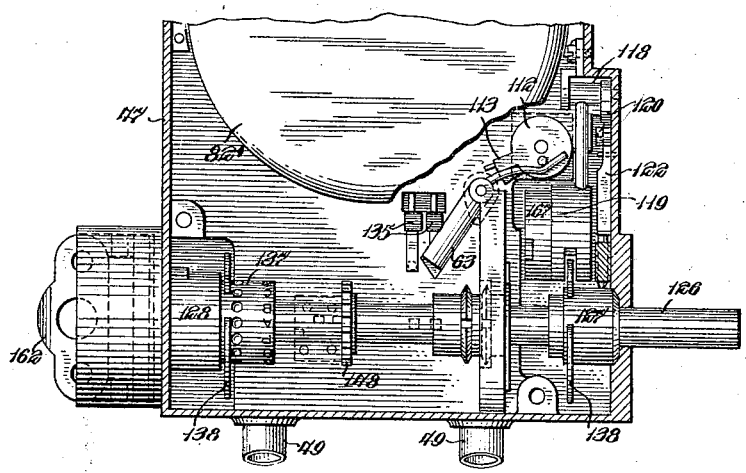
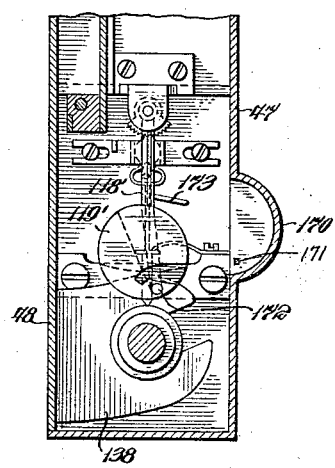
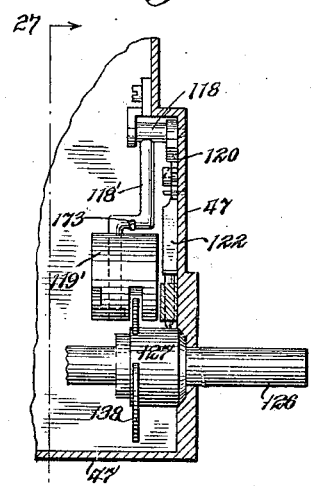

March 4, 1924.

V. P. FEDOROFF 1,485,498

ALARM DEVICE

Filed Feb. 17, 1920 — 13 Sheets-Sheet 9

Inventor
Vladimir P. Fedoroff.
By Kenyon & Kenyon,
his Attorneys

March 4, 1924.

V. P. FEDOROFF

ALARM DEVICE

Filed Feb. 17, 1920   13 Sheets-Sheet 10

1,485,498

Inventor
Vladimir P. Fedoroff.

By Kenyon & Kenyon,
his Attorney

March 4, 1924.  1,485,498
V. P. FEDOROFF
ALARM DEVICE
Filed Feb. 17, 1920   13 Sheets-Sheet 11
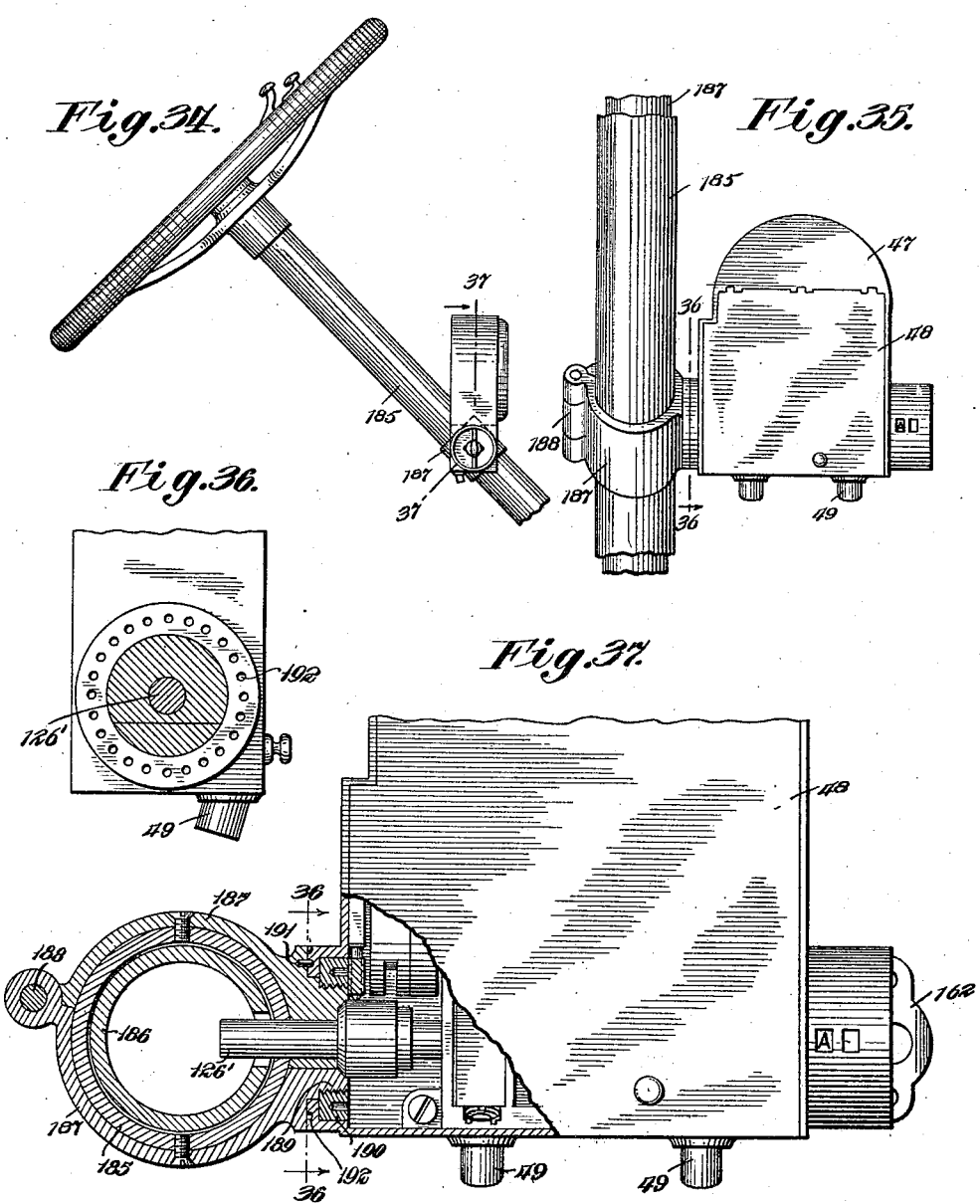

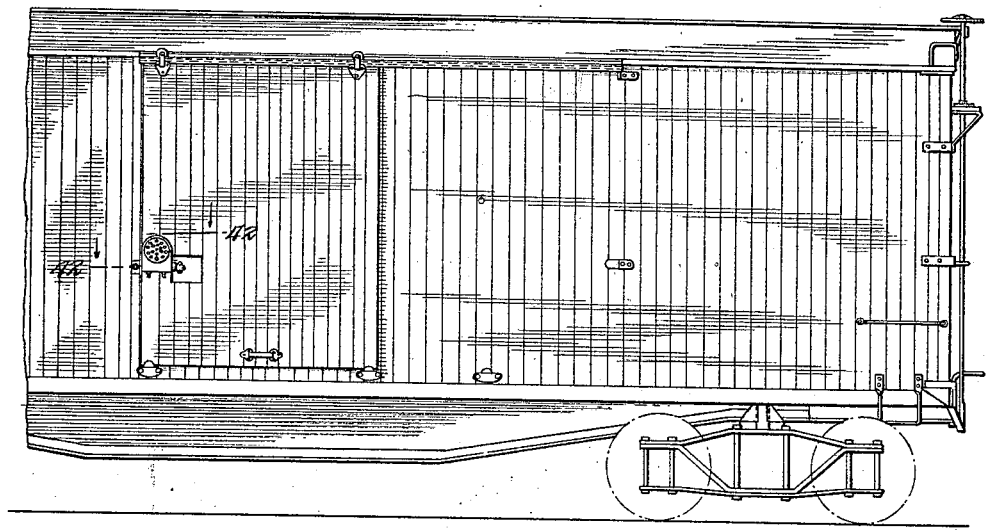

March 4, 1924.  1,485,498
V. P. FEDOROFF
ALARM DEVICE
Filed Feb. 17, 1920  13 Sheets-Sheet 13

Inventor
Vladimir P. Fedoroff.

By Kenyon & Kenyon,
his Attorneys

Patented Mar. 4, 1924.

1,485,498

UNITED STATES PATENT OFFICE.

VLADIMIR P. FEDOROFF, OF NEW YORK, N. Y.

ALARM DEVICE.

Application filed February 17, 1920. Serial No. 359,260.

*To all whom it may concern:*

Be it known that I, VLADIMIR P. FEDOROFF, a citizen of Russia, residing in the city, county, and State of New York, have invented certain new and useful Improvements in Alarm Devices, of which the following is a specification.

My invention relates to alarm devices and particularly to devices for the detection or prevention of attempted theft.

It is an object of my invention to provide an alarm device which will give a signal when the device is tampered with or moved out of a definite position.

Another object of my invention is to provide an alarm device which may be set to operative or inoperative condition in which the setting means may be used as a lock operating means.

Another object of my invention is to provide an alarm device which may be set to operative or inoperative condition and in which the setting means may be used to set off the alarm if an attempt is made to set the alarm to inoperative condition by one who is unfamiliar with the mechanism.

Another object of my invention is to provide an alarm device which will be set off upon change of its position; a further object being to provide means to prevent setting off the mechanism by shocks, jars, or jolts.

Another object of my invention is to provide an alarm mechanism embodying one or more of the objects above stated which may be embodied in a locking mechanism for a door, automobile, or the like.

Other objects of my invention are to provide particular constructions for carrying out one or more of the objects above stated, and other objects of my invention will appear from the following description taken in connection with the accompanying drawings forming a part of this specification, and will be pointed out in the hereunto appended claims.

In the drawings in which like reference characters indicate similar parts—

Fig. 5 is a sectional view on the line 5—5 of Fig. 2;

Fig. 6 is a partial section on the line 6—6 of Fig. 4;

Fig. 7 is a partial section on the line 7—7 of Fig. 3;

Fig 8 is a partial sectional view on the line 8—8 of Fig. 11;

Fig. 9 is a detailed view;

Fig. 10 is a sectional detailed view;

Fig. 11 is an enlarged detailed view;

Fig. 12 is a vertical section of the device shown in Figs. 1 to 4 taken from the opposite side;

Fig. 13 is a sectional view on the line 13—13 of Fig. 12;

Figs. 14 and 15 are detailed views;

Fig. 16 is an elevation view of the device shown in Figs. 1 to 4 with the cover raised;

Fig. 17 is a sectional view on the line 17—17 of Fig. 16;

Fig. 18 is a vertical sectional view of the device shown in Figs. 1 to 4 taken from the opposite side;

Fig. 19 is a sectional view on the line 19—19 of Fig. 18;

Figs. 20 and 21 are sectional views of a control shaft;

Figure 1:
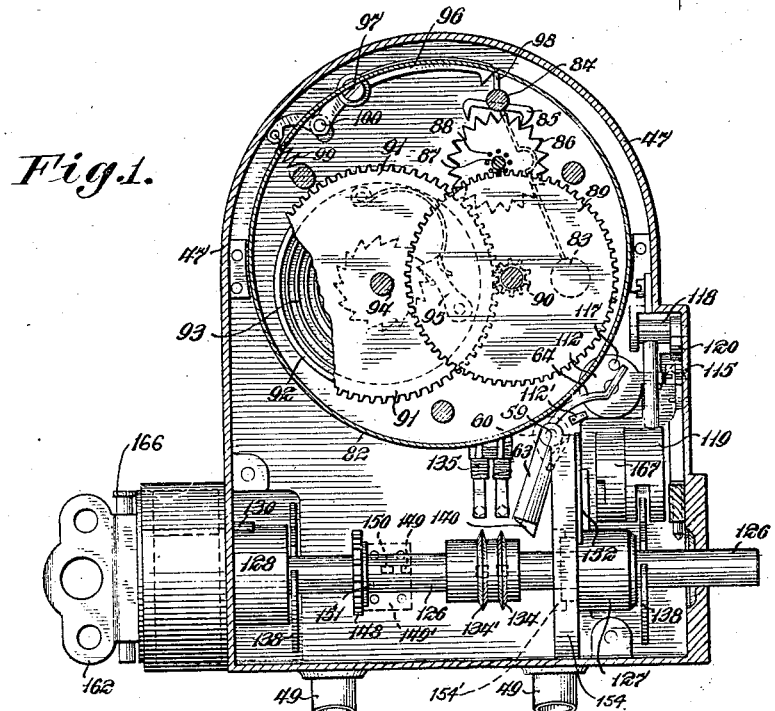
Fig. 1 is a vertical sectional view of an alarm device embodying my invention.
Figure 2:
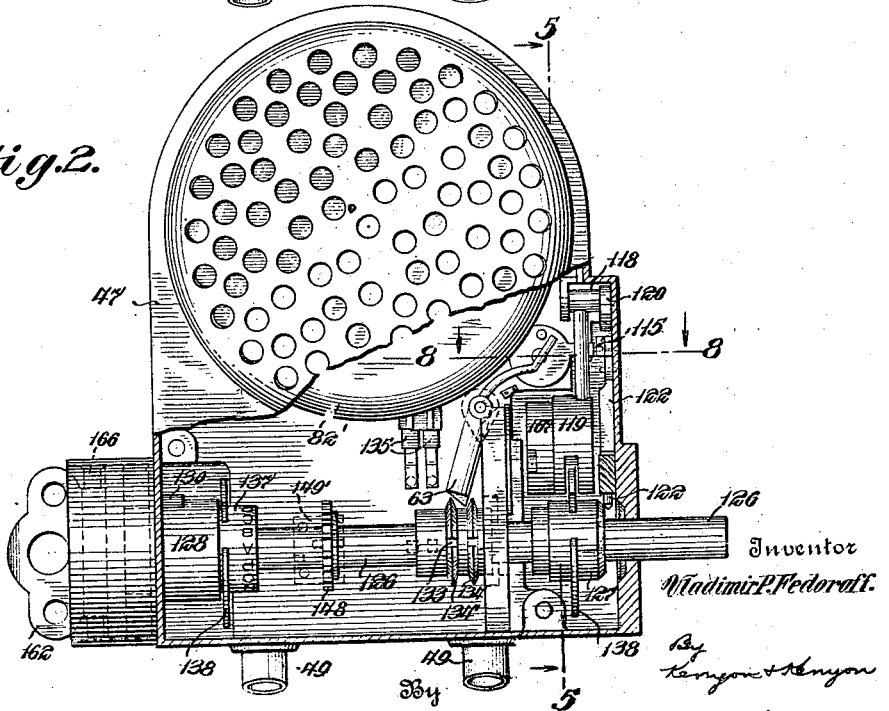
Fig. 2 is a partial vertical section of the device shown in Fig. 1 in a different setting.
Figure 22:
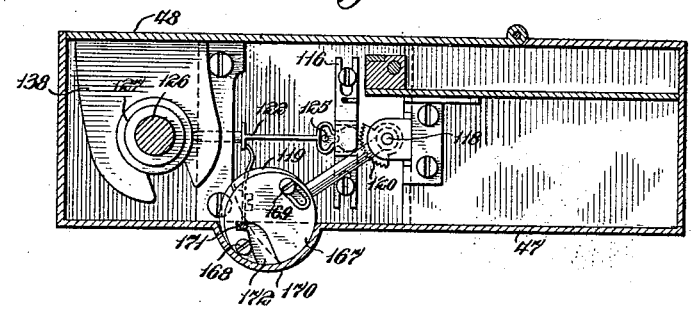

Fig. 22$^a$ is a section on the line 22$^A$—22$^A$ of Fig. 20;

Figs. 22 to 25 are sectional views with the parts in various positions on the line 22—22 of Fig. 18;

Fig. 26 is a partial sectional view of the construction shown in Fig. 1 after release of the alarm mechanism.

Figure 29:
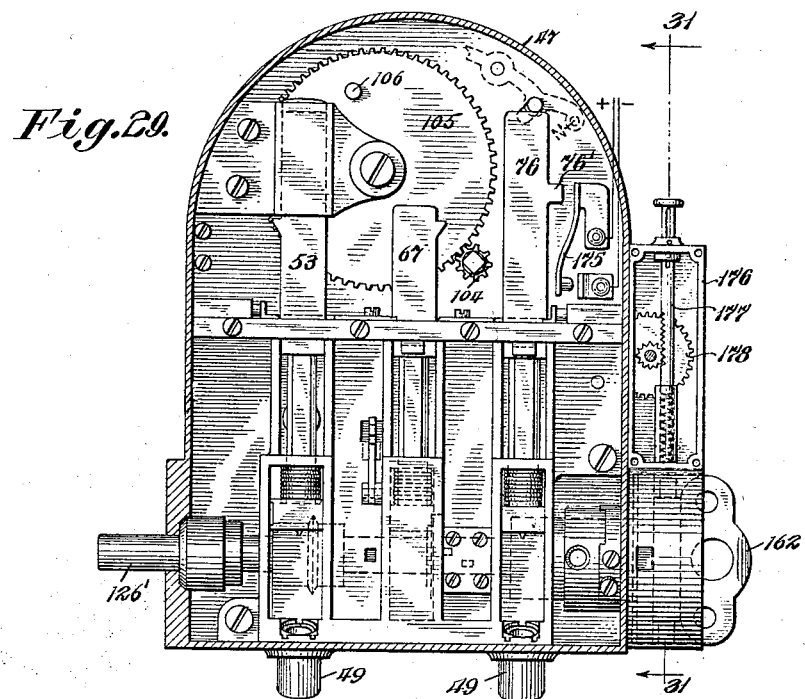
Figure 30:
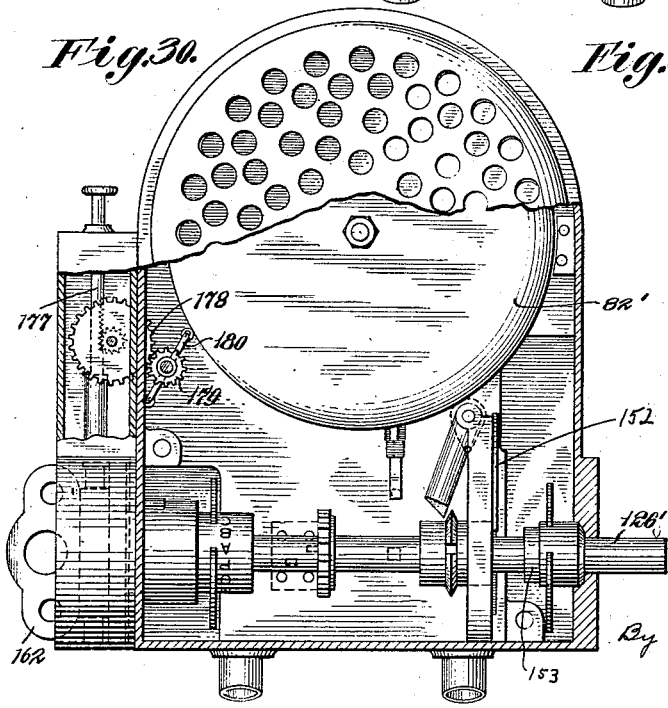
Figure 31:
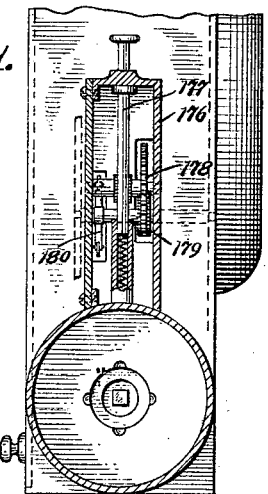
Figure 32:
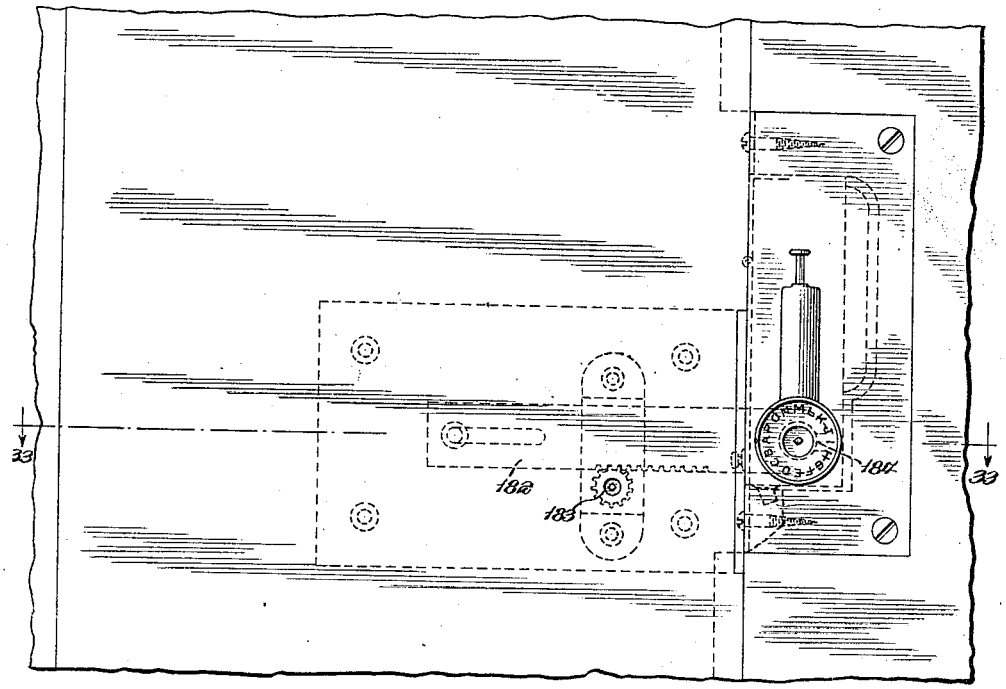
Figure 33:
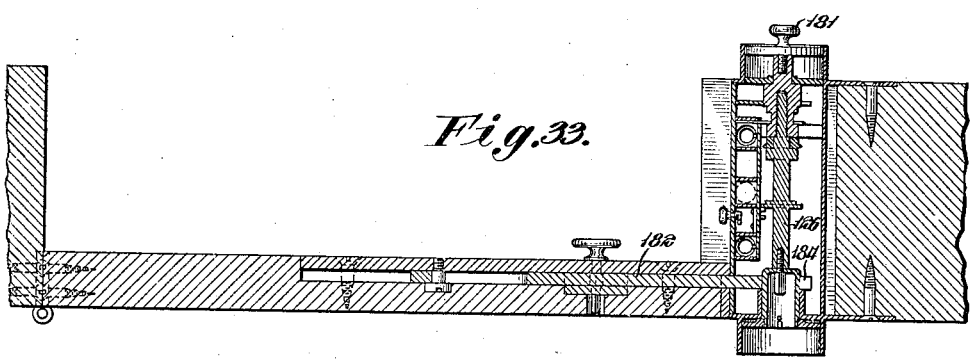
Figure 43:
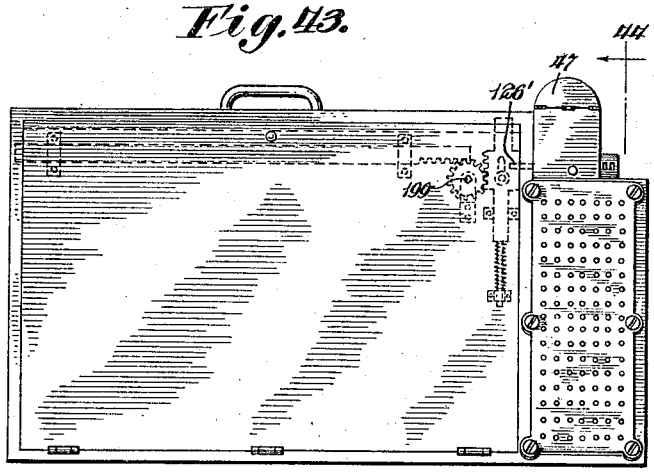
Figure 44:
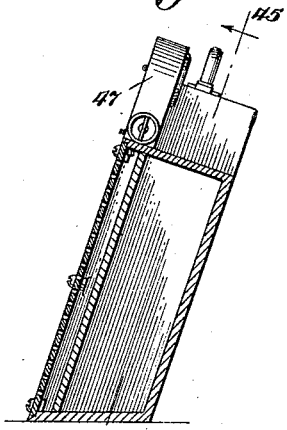
Figure 45:
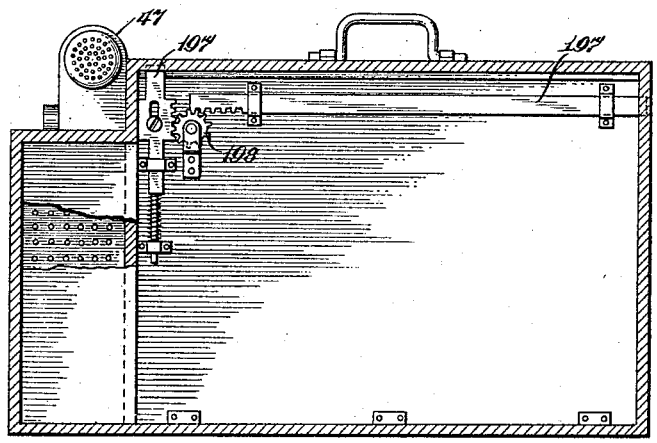

Fig. 27 is a sectional view of a modified form on the line 27—27 of Fig. 28;

Fig. 28 is a partial elevational view of the modified construction shown in Fig. 27;

Fig. 29 is a vertical section of a modified construction;

Fig. 30 is a vertical section of the construction shown in Fig. 29 from the opposite side;

Fig. 31 is a vertical section on the line 31—31 of Fig. 29;

Fig. 32 is an elevation showing the method of adapting my construction shown in Figs. 29 to 31 of a door lock;

Fig. 33 is a sectional view on the line 33—33 of Fig. 32;

Figs. 34 and 35 illustrate the method of adapting my alarm device to an automobile steering wheel;

Fig. 36 is a detailed sectional view on the line 36—36 of Fig. 35;

Fig. 37 is a partial sectional view on the line 37—37 of Fig. 34;

Figs. 38 and 39 illustrate the method of adapting my construction to a sliding door, such as a car door;

Fig. 40 is a sectional view on the line 40—40 of Fig. 39;

Fig. 41 is a sectional view on the line 41—41 of Fig. 39;

Fig. 42 is a sectional view on the line 42—42 of Fig. 38;

Fig. 43 illustrates the method of adapting my device to a portable case;

Fig. 44 is a section on the line 44—44 of Fig. 43;

Fig. 45 is a sectional view on the line 45—45 of Fig. 44; and

Figure 46:
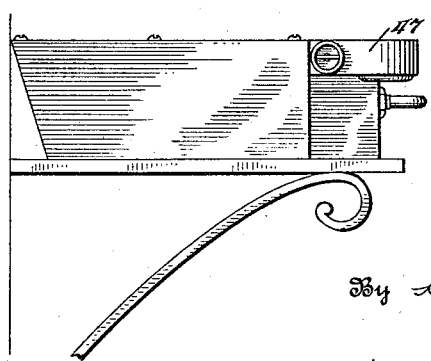

Fig. 46 illustrates a portable case in a position wherein the automatic locking mechanism of my construction is of importance.

In the embodiment of my invention illustrated in the accompanying drawings for the purposes of disclosure the alarm mechanism which is enclosed within the casing 47 having a door 48 (see Figs. 16 and 17) comprises alarm giving means, which means includes alarm devices such as a bell and cartridge holding means, and also means for actuating the bell, and means for detonating the cartridges. In addition to the alarm giving means the alarm mechanism includes means for restraining the alarm giving means, means for effecting the release of the restraining means and means for controlling the alarm mechanism and in particular the releasing means thereof. The controlling means under certain conditions is also effective as releasing means so that it may be said that the releasing means includes certain features of the controlling means and also a balance means controlled by the controlling means—all of which will appear from the following description.

Referring to Figs. 12 and 16 it will be seen that the casing is provided with the chambers 49 for cartridges and with a partition 50 extending vertically therein. Secured to this partition is a frame 51 which has openings for receiving the cartridges and vertically extending guides 52 for the cartridge detonating hammers. One of these hammers 53 is shown in detail in Fig. 9. The hammers pass through openings in cross members 54 between the guides 52, and between the hammer head 55 and the cross member there is positioned a spring 56 for forcing the head which carries the detonating point 57 toward the cartridge. This hammer is held in its upward position with the spring compressed by means of a trigger member 58 shown in Figs. 1 to 4 and in detail in Fig. 11. This trigger member includes a pivot 59 on one end of which is an arm 60 carrying the lug 61 adapted to engage in the recess 62 (see Fig. 9) when the hammer is in upward position. Attached to the other end of the pivot member 59 is a latch member 63 and a trigger arm 64 hereinafter referred to which are actuated to release the hammer by moving the part 61 out of the recess 62. Within the casing there is also a cross partition 65 (see Figs. 16 and 19) on which there is mounted a plate 66 having a notch through which passes the hammer 53. A spring 68 normally presses the plate 66 toward the plunger 67 so that its end enters a recess 69 (see Fig. 18) in the side of the plunger and a sloping face 70 on the side of the hammer strikes the edge of this plate as the hammer 53 moves downwardly compressing the spring and slipping the plate out of the notch 69, whereupon this plunger is released, but it has on its lower end a piston 71 slipping downward in a cylinder 72 under the action of the spring 73. This cylinder has a small opening 74 positioned within a slot 75 so that the air escaping through the opening 74 will retard the downward movement of the plunger 67, but when it reaches the slot 75 (see Figs. 16 and 19) the air will pass upward around the piston and the downward movement will be more rapid.

The hammer 76 sliding between its guides 52 under the action of its spring is normally held in upward position by a plate 77 having a slot 78 through which the hammer passes so that the edge of the slot passes into a notch 78' in the side of the hammer. As the plunger 67 moves downward its sloping face 79 strikes the plate 77 moving it out of engagement with the notch 78', permitting the hammer 76 to detonate its cartridge shortly after the first cartridge is detonated The plunger 67 and the hammer 76 have lugs 80 which are engaged by the loops 81 which are pivoted to the inner face of the cover and held against the plunger 67 and the hammer 76 by means of springs 82, thus raising of the cover restores the plunger 67 and the hammer 76 to their upward position, in which they are held by the spring pressed plates 66 and 77 respectively. The cover is also held up by these springs.

The bell 82' has cooperating with it a clapper 83 which is mounted on a pivot 84 which has a release member 85 cooperating with a star wheel 86 mounted on a shaft 87, which also carries the pinion 88 driven by the wheel 89 mounted on the shaft which carries the pinion 90 which is engaged by the wheel 91 on the drum 92 of the spring 93.

The spring 93 is wound by the shaft 94 and restrained by the ordinary ratchet 95 mounted on gear 91 closing the end of the spring drum. The lever 96 (see Figs. 1 to 4) pivoted at 97 is normally held out of engagement with the projection 98 on the escapement 85 by the spring 99, but it carries a projection 100 which is acted upon by the hammer 76 (see Fig. 12) to swing down its sloping face 101 so as to hold the escapement 85 against movement. This face is made sloping so as to swing the escapement always in the same direction so that the clapper will not rest against the bell and the bell will be free to be rung by the mechanism shown in Figs. 29 to 33. In order to prevent over-winding the gears 102 and 103 are provided and there is a long tooth on one gear and a short slot on the other so that after a certain number of rotations the long tooth and the short slot will cooperate and stop the winding movement. This means will also stop the unwinding movement at the proper point. The gear 102 is connected to the winding shaft. The pinion 104 is mounted on the winding shaft 94 and engages the wheel 105 (see Figs. 12 and 18). On the wheel 105 is a projection 106 which rotates in the direction of the arrow in Fig. 12 while the alarm mechanism is unwinding and it comes around underneath the shoulder 107 on the hammer 53 and raises the hammer up so that the member 61 may be brought into the recess 62 by means of the spring 108 acting on the pivot 59. When the mechanism is rewound the projection 106 is brought to the position shown in Fig. 12 so that it does not interfere with the downward motion of the hammer.

From the construction so far described it will be apparent that the unwinding of the alarm mechanism brings the hammer 53 to operative position and the raising of the cover brings the plunger 67 and the hammer 76 to operative position, and that the hammer 76 restrains the bell ringing mechanism and that the hammer 53 is restrained by the trigger mechanism, and that when the trigger mechanism is released the hammer 53 will drop down releasing the plunger 67 which will move down slowly and then rapidly and release the hammer 76, whereupon the bell ringing mechanism will be released.

Mounted in the partition 50 is a shaft 109 to which is secured a spring 110 which is attached to the housing 111. On the one end of this shaft is winding means and on the other end there is mounted a disk 112 (see Figs. 8 and 11), which has an arm 113 through which projects the end of the curved resilient member 114, which upon rotation of the shaft is brought in position underneath the lug 115 (see Figs. 11 and 13) on the part 116 which is mounted as shown in Fig. 13, to slide to a position to remove the lug 115 from its normal position over the member 114. Such a movement disengages the member 114 and the spring 110 rotates the disk so as to bring the projection 117 thereof in engagement with the arm 58 to operate the trigger mechanism above described. Movement of this member 116 to release the restraining mechanism or trigger through the operation thereby of the lug 117 under the action of the disk 112 which is ordinarily under tension is brought about as follows.

I provide a pivot 118 upon which is suspended a weight or balance member 119 and on the pivot 118 I attach a sector 120 (see Figs. 1 to 4 and 13). Across the casing is a transverse member 121 in which slides vertically a resilient part 122 normally held down by the spring 123. This part engages the member 116 by passing through guides 124 thereof and has at its top teeth for engaging the sector 120. Thus when the member 122 is pressed upward into engagement with the sector a swinging of the balance rotates the sector and moves the part 122 sidewise, which in turn moves the part 116, disengaging the lug 115 from the part 114 which holds the disk 112 under tension. The part 122 has an opening surrounding the lug 125 carried by the casing and this opening has a narrow portion at the top so that when the member 122 moves downward the lug 125 is in the narrow portion and locks the member 116 against displacement. Through the casing extends a shaft 126 which has an enlargement 127, one edge of which is sloped to engage with the lower end of the member 122 so that longitudinal movement of the shaft raises the member 122 into engagement with the sector 120 and thus adjusts the alarm mechanism to operative connection, whereupon tilting of the casing causing a swinging of the balance moves the movable part 115 from a position wherein it restrains the disk 112 which is under tension, and the lug 117 operates the trigger and releases the restraining mechanism. As shown in Figs. 14 and 15, this shaft 126 carries 4 rows of depressions, each of which encircles it. The portion of the shaft carrying the depressions fits within the sleeve 128 within the casing through which extends a detent 129 acted upon by the spring 130 (see Fig. 3). When the row 131 (see Fig. 1) of depressions is under the detent 129 the adjusting members 132 (see Figs. 4 and 6) may be swung down upon the pivots by which they are mounted upon the partition 50 and a nose on these adjusting members 132 will project through openings in the partition and respectively engage in notches 133 on the rings 134 and 134' (see Figs. 15 and 20) which are resiliently held in position on the shaft 126 by means of spring detents 133' in order that the position of the rings on the shaft 126 may be adjusted. These adjusting members are provided with handles 135 which prevent closing of the door 48 while the adjusting members are in position, so that the combination hereinafter described may not be lost by forgetting to remove the adjusting member 132.

When the detent 129 is acting upon the row of depressions 136 (see Fig. 4) the enlarged hub 127 on the shaft 126, and the enlarged portion 137 in which the depressions are made, respectively pass through openings in the plates 138 secured to the inner face of the door thereby locking it.

When the detent 129 is acting upon the row of depressions 139 (see Fig. 2) the hub 127 has not yet been pushed in far enough to raise the member 122 and adjust the balance releasing mechanism to operative connection, but the ring 134 has snapped past the latch 140 (see Fig. 10) of the trigger part 63 and any attempt to withdraw the controlling shaft 126 to a position to unlock the casing will actuate the trigger and release the alarm mechanism, but change of position of the mechanism will not release the alarm mechanism because the balance means is not operative. When the detent 129 is acting upon the row of depressions 142 (see Fig. 3) the controlling member has been pushed in far enough to cause the member 122 to be brought up in co-operative relation with the sector of the balance means and change of position will release the disk 112 in the manner above described, which will operate the trigger mechanism and set off the alarm.

It is also to be noted that the ring 134' has been snapped past the latch 140 so that an attempt to withdraw the controlling mechanism, unless a notch 133 is in line with the latch 140, will cause a swinging of the trigger member 63 and a releasing of the alarm. In order that a person may know how to withdraw the controlling member to render the alarm mechanism inoperative there is placed upon the disk 144 on the shaft 126 a series of characters which may be seen through openings 145 in order to indicate the position of the controlling shaft 126. There is a setting of the controlling shaft 126 for each character and the detent will hold the shaft resiliently in each of these settings. When the position of the notches 133 is adjusted as above described there will appear at the opening 146 (see Fig. 16) the character which is on the hub carrying the detents which must appear before one of the openings 145 on the disk 144 in order that a slot 133 will be in line with the latch member 140 of the trigger 63. It will be apparent that the two rings 134 and 134' may be set for different characters giving a combination including two characters which must be known before the controlling member may be withdrawn from the position shown in Fig. 3 to the position shown in Fig. 1 wherein the alarm mechanism cannot be set off.

In order to prevent feeling out the combination the spring 130 of the detent 129 is made very strong so that a strong pull will be required in order to change the adjustment and the setting of the shaft 126, and in order that the shaft may not be drawn out until one of the rings 134 or 134' is against the latch 140, and then rotated in order to feel where the slot is I mount on the shaft 126 a toothed wheel 148 which engages with lugs 149, 150 and 151 supported on plate 149' (see Figs. 4 and 18) during the time this shaft is being changed from one adjustment to another. The engagement of the teeth of this wheel with the lugs also prevents rotation of the shaft 126 while the latch 140 is in one of the notches 133 so that change of adjustment of the rings or breaking of the latch is prevented.

Figure 3:
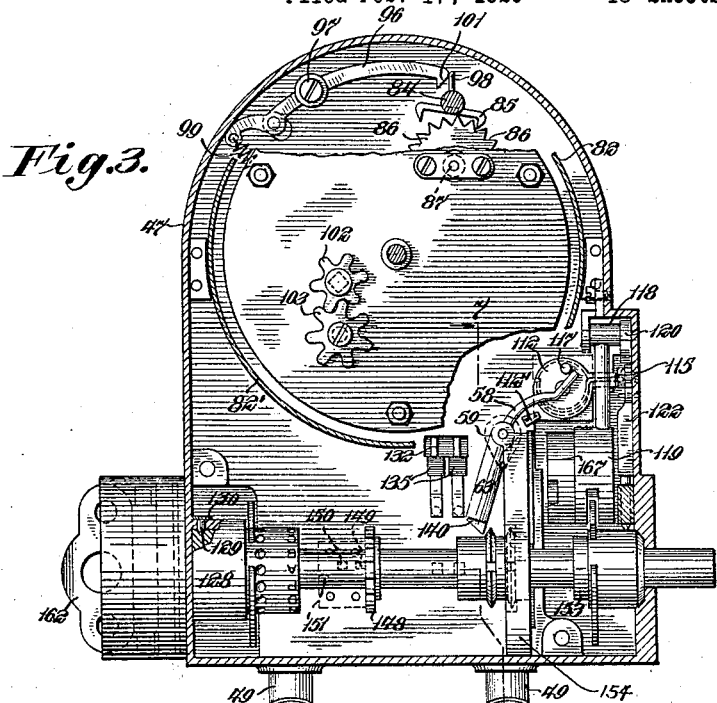
Figs. 3 and 4 are vertical sections of the device shown in Fig. 1 in different settings.
Figure 4:
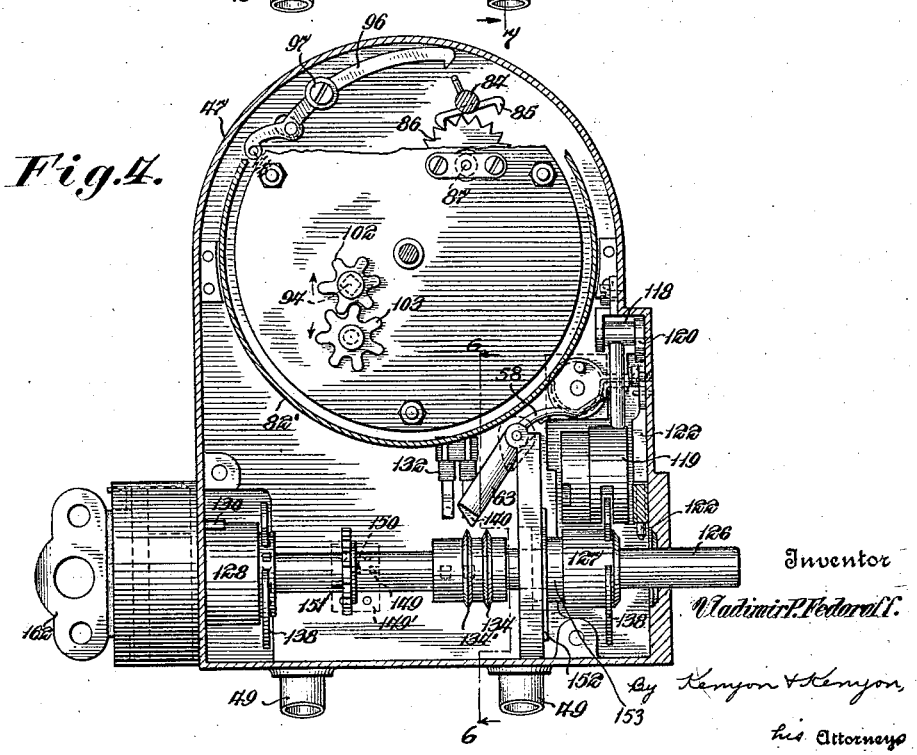

The hammer 53 carries a U-shaped locking member 152 (see Figs. 9 and 4) which comes down with the hammer upon release of the alarm mechanism and straddles the shaft 126 in front of the enlargement 127 thereof so that as soon as the alarm mechanism is released the shaft 126 is held against further withdrawal or change of adjustment of a position to release the cover until the hammer 53 is raised by the final movement of the bell ringing mechanism by means of the lug 106. In order to prevent a quick withdrawal of the controlling shaft from a position such as shown in Fig. 3 to the position shown in Fig. 1 wherein the cover is unlocked and the bell-ringing may be stopped before the locking member 152 can come down and lock the shaft against movement I stagger the lug 151 out of the line of the lugs 149 and 150, so that while the shaft may be quickly withdrawn to the position shown in Fig. 4 it must be manipulated and its setting slightly changed before it can be withdrawn to a position shown in Fig. 1, in which time the lock 152 will come down and act. It is to be noted that the depressions of the row 136 are slightly staggered from the lines formed by respective depressions in the rows 131, 139 and 142. The action of the detent requires the application of considerable force upon the shaft 126 in order to bring it to a position in which it is safe to change its adjustment to one in which the alarm mechanism is inoperative, and this with the staggering of the lugs which cooperate with the toothed wheel, renders it impossible to feel out the safe setting of the controlling shaft. The door 48 carries projections 160 (see Figs. 7, 16 and 17) which occupy a position above the cartridges when the door is closed in order to prevent knocking them out of operative position from the outside of the alarm mechanism. The part 112' is a stop for the arm of the disk 112.

Referring to Figs. 20 to 22ª, it will be seen that the controlling shaft 126 is recessed at its end and therein is the square plug 161. Into this recess extends a key member 162 provided with a spring pressed detent 163 adapted to fit into one of the four perforations 164. It will be seen that the square shape of the plug which is accommodated by the square opening 165 in the key 162 insures that the detent will always be in position to engage one of the openings 164. The detent 163 may be withdrawn by pressure upon the releasing member 166 of the key 162. It is thus possible to disconnect the key from the shaft 126 and then push the shaft to effect the desired adjustment of the controlling member whereupon the controlling member is left without convenient means for changing its setting, that is rotating it, so as to render feeling-out the setting of the controlling member still more difficult but upon insertion of the key it is possible to change the setting of the controlling member 126 so that it may be withdrawn by one who knows the combination without setting off the alarm.

A rigid wall 154 (see Figs. 1 to 4, 7 and 17) is secured to the partition 50 and has an opening through which the controlling shaft 126 passes. This wall is provided with an annular depression 154' surrounding the shaft 126 to accommodate the ring 134. (See Fig. 3). It will be seen in Fig. 4 that the lock 152 attached to the hammer 53 lies in contact with this partition 154 when the hammer is down and the locking member obstructs the movement of the boss 153 into the opening in the plate 154. Thus the force applied to the key 162 to withdraw the shaft 126 will not bend the locking member 152.

From Figs. 1 and 16 it will be apparent that the key 162 can only be disconnected from the shaft 126 by depression of the releasing member 166 when the shaft is in its outermost position because the collar surrounding the key and disk 144 will prevent anyone from depressing the releasing member 166 if the shaft is in any other position. Thus the key may be withdrawn and the shaft pressed in and it will be impossible to withdraw the shaft unless one is provided with a key. Or, on the other hand, if the shaft has been pressed in so as to set the alarm giving mechanism to operative position, then the key may not be detached without setting off the alarm unless someone knows the combination and is able to withdraw the shaft to the position shown in Fig. 1.

Figure 24:
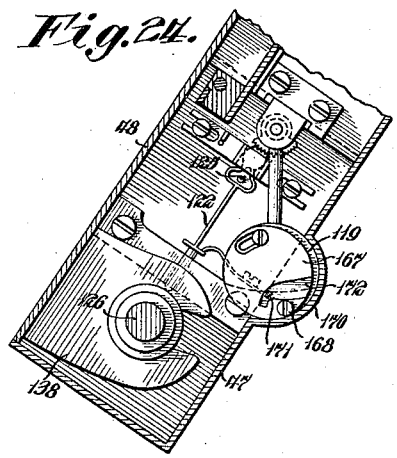
Figure 23:
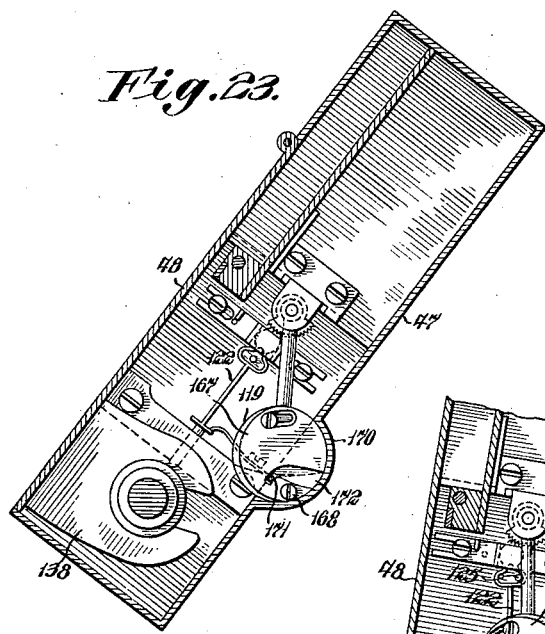
Figure 25:
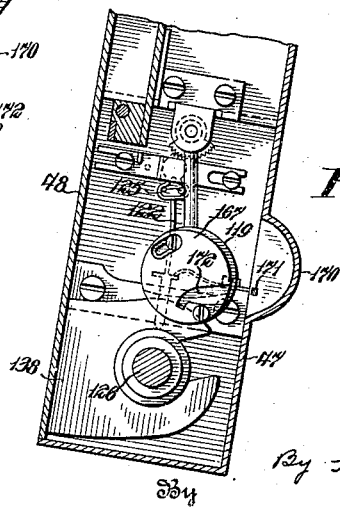

Referring to Figs. 5 and 22 to 25, it will be seen that the weight 119 of the balance member has pivoted upon it an auxiliary weight 167 by means of a pivot 168. Movement of this auxiliary weight 167 upon its pivot 168 is limited by the screw 169 in a slot therein. When a portable device is positioned as shown in Fig. 46 the balance weight will swing over until it rests in the extension 170 of the casing and as it swings to this position a lug 171 (see Fig. 17) supported on the casing will be accommodated by the slot 172 in the auxiliary weight 167, but as the auxiliary weight 167 swings about its pivot 168 the lug 171 will occupy the position in which it is shown in Fig. 22. It will thus be seen that any jarring or jolting or sudden upward and downward movement of the alarm device will not swing the balance weight 119 because there is a flat face against the lug 171, but as the alarm device is swung up toward a vertical position as shown in Fig. 23, and the auxiliary weight swings across its pivot as shown in Fig. 24, the flat face will slide out from in front of the lug 171 and the balance member will be released and will swing to position shown in Fig. 25 which will cause a flexure of the member 122 and a consequent movement of the part 116 to release the restrained disk 112 and set off the alarm mechanism. As soon as the control member is withdrawn to permit the member 122 to be slid down to its lower position it will disengage from the sector 120 and its resilience will bring the part 122 to normal position, in which it will be locked by the pin 125. The sloping face of the opening surrounding the pin will also assist in this action.

In Fig. 26 the restrained disk 112 is shown in its released position. From this figure it will be apparent that it is necessary to wind up the spring acting on the disk 112 to restore it to position under the lug 115 before the bell operating spring is wound to carry the lug 106 out from under the shoulder 107 of the hammer 53.

In Figs. 27 and 28 I have shown a modified form of balance in which the weight 119' is pivoted to the shank 118' of the balance member by a pivot 172. The shank 118' is provided with a stop member 173 which engages with the side of the casing as the balance member swings toward the extension 170 of the casing and stops the swinging of the shank after which the weight 119' swings on its pivot around the lug 171 on the casing and locks the balance against the operation by shocks and jars.

In Figs. 29, 30 and 31 I have shown some additional features wherein the hammer 76 has a lug 76' which engages with a spring contact member 175 to close a circuit and operate an electric alarm at a distance. There is also mounted on the casing a compartment 176 in which there is mounted for motion against a spring a vertical shaft 177 which carries a rack operating the gear 178 which in turn operates the gear 179 on which is mounted a rod 180 carrying loose bell clappers at its ends. This construction is adaptable for use with a door and the end 126' of the controlling member is the lock operating means.

The balance releasing means is omitted from this construction. The shank 177 is operated as a door bell and utilizes the alarm bell itself from which the clapper is withdrawn as above explained.

In Figs. 32 and 33 I have shown my construction as mounted in a door and provided with an auxiliary control member operating device 181 for operating the door lock from within, and the usual key controlled means for operating the control member from without. The bolt 182 of the door may be operated by a gear 183 and the end of the bolt has a slot 184 large enough to pass over the control shaft 126, but when the hub passes into the opening in the end of the bolt 182 it may not be withdrawn without knowledge of what setting of the control shaft is necessary in order to withdraw it without operating the alarm.

In Figs. 34 to 37 I have shown means for mounting my alarm device on a steering wheel of an automobile, in which case the extension 126' of the controlling shaft extends through the steering post 185 into the steering rod 186. I mount my device on the steering post by means of two members 187 which surround the post and are pivoted at 188, but where they come together they have a threaded boss 189 onto which the casing is held by the nut 190. A dowel pin 191 may fit in any of the openings 192 to permit positioning of the alarm device at any desired position.

In Figs. 38 to 42 I have shown the manner of mounting my alarm device on a sliding door in which case the door jamb is provided with a plate 193 into which extends a perforated tongue 194 carried by the door. Through this perforation extends a nut 195 which may normally be held in place by the screw 196, but in order to lock it in place the extension 126' of the control shaft of my alarm device extends into an opening thereof.

In Figs. 43 to 46 I have shown the adaptation of my alarm device to a portable case. The case is provided with an angular base so that when it is picked up it will assume a vertical position and the balance releasing means will be operated. The locking member of my alarm device holds in place the spring actuated bolts 197 which are connected together through the gear 198, on the shaft of which a squared head 199 provides for withdrawal of the bolts by use of a key when they are not locked by a locking member 126'.

While I have described my invention in connection with the embodiment shown for the purpose of illustration thereof in considerable detail, I do not intend that my invention shall be limited to the details described but that it shall be defined by the hereunto appended claims.

What I claim as new and desire to secure by Letters Patent is:

1. In combination, a casing having a door, alarm mechanism therein, and means rendered effective by operation of said mechanism in the giving of an alarm to prevent opening of said door.

2. In combination, a casing having a door, alarm mechanism therein for giving a prolonged alarm, and means for preventing opening of said door during a substantial part of the period of said alarm and permitting opening of said door thereafter.

3. In an alarm device, a plurality of plungers movable to set off cartridges, means for actuating said plungers and means for retarding one of said plungers during a portion of its movement.

4. In an alarm device, a plurality of plungers movable to set off cartridges, means for actuating said plungers, releasable means for restraining said plungers, the restraining means for one of said plungers being released by movement of another of said plungers, and means for retarding one of said plungers during a portion of its movement.

5. In combination, a casing having a door and locking means therefor, alarm mechanism in said casing, means operated by said alarm mechanism to restrain operation of said locking means to unlock said door, and a second alarm mechanism operating said restraining means to permit operation of said locking means to unlock said door.

6. In combination a casing having a door and locking means therefor, alarm means, means operated thereby to prevent operation of said locking means, and a second alarm means set into operation by said first alarm means and operating said preventing means to permit unlocking of said door.

7. In combination a casing having a door, an alarm-device therein and means for setting said mechanism to operative condition upon opening said door.

8. In combination a casing having a door, said casing having openings for the insertion of cartridges from within said casing, means for descharging said cartridges and means operated by said door for preventing displacement of said cartridges from without.

9. In combination, a casing having a door, alarm mechanism therein, means for locking said door, and means actuated by operation of said mechanism for restraining said locking means against operation to unlock said door.

10. In combination, a casing having a door, mechanism therein for giving a prolonged alarm, means for locking said door, means for restraining said locking means against operation to unlock said door during a substantial part of the period of said alarm and for automatically releasing said locking means for operation to unlock said door thereafter.

11. In combination, a casing having a door, locking means therefor, first alarm mechanism including a part movable in the operation of said mechanism, means operated by said movement of said part for preventing operation of said locking means to unlock said door, second alarm mechanism, and means operated thereby for restoring said part to initial position, whereby said locking means is released for operation.

12. In combination, alarm giving means, restraining means therefor comprising a trigger, balance controlled means for imparting motion to said trigger, and means for controlling said balance controlled means and including a member rotatable to a plurality of settings in certain of which movement other than said rotation imparts motion to said trigger.

13. In combination, alarm giving means, restraining means therefor including a member movable to release said restraining means, and releasing means comprising a part engaging said member, and balance means for moving said part and adjustable into and out of cooperative relation with said part.

14. In combination, alarm giving means, restraining means therefor including a member movable to release said restraining means, and releasing means including a resilient part engaging said member, and balance means for flexing said part, said part and balance means being adjustable into and out of cooperative relation for flexure of said part to move said member.

15. In combination, alarm giving means, restraining means therefor including a member movable to release said restraining means, releasing means including a part in engagement with said member, and balance means for moving said part, said part and balance means being adjustable into and out of cooperative relation and means for locking said part when it and said balance means are out of cooperative relation.

16. In combination, alarm giving means, restraining means therefor including a member movable to release said restraining means and releasing means including a part in engagement with said member, and balance means for moving said part, said part and balance means being adjustable into and out of cooperative relation, said part being resilient to bias said member to a position wherein said restraining means is operative to restrain said alarm giving means.

17. In combination alarm giving means, restraining means therefor including a member movable to release said restraining means, a pivoted balance having a sector mounted on its pivot, and a part engaging said member, said part and sector being adjustable into and out of cooperative relation.

18. In combination alarm giving means, restraining means therefor including a member movable to release said restraining means, a pivoted balance having a sector mounted on its pivot, and a part engaging said member, said part and sector being adjustable into and out of cooperative relation, said part being resilient and supported for flexure by said balance.

19. In combination alarm giving means, setting-off means therefor including a trigger provided with a latch, controlling means for said setting-off means and having a member movable past said latch in one direction and engaging said latch when moved in the reverse direction.

20. In combination alarm giving means, restraining means therefor including a trigger, means under tension for moving said trigger and balance means including a part for restraining said means under tension, and a resilient part biasing said part to restraining position and movable to adjust said balance means to operative or inoperative condition.

21. In combination, a casing having a door movable to and from closing position and having a part attached thereto, an alarm giving means and means for setting off said alarm giving means therein, and a control member extending through the wall of said casing and movable to adjust said setting-off means into and out of operative condition, said adjusting movement of said control member also moving said member into and out of the path of movement of said part to effect a locking and unlocking of said door.

22. In combination, alarm giving means, setting-off means therefor, controlling means for adjusting said setting-off means to operative or inoperative condition and a spring detent means acting upon said controlling means to prevent gradual movement of said controlling means to feel out an adjustment thereof wherein said setting off means is in inoperative condition.

23. In combination alarm giving means, restraining means therefor controlling means susceptible of a plurality of settings in certain of which said means is operative upon movement to release said restraining means and spring detent means acting upon said controlling means to retard changes of setting or movement.

24. In combination a casing having a door, alarm mechanism including a controlling shaft having a notched member adjustably mounted thereon, and a member movable into said notch for adjusting said member and including a part for obstructing the closing of said door when said adjusting member is in position to effect adjustment of said notched member.

25. In combination alarm mechanism, including a controlling shaft susceptible of a plurality of adjustments and a plurality of settings and having a row of depressions for each adjustment and a depression in each row for each setting and a spring detent cooperating with said depressions, whereby feeling-out of the setting of said shaft is prevented.

26. In combination a casing having a door and locking means therefor, alarm mechanism therein including a shaft having an adjustment wherein said locking means is rendered operative and an adjustment wherein movement to another adjustment sets-off said alarm mechanism, locking means for said shaft operated by said alarm mechanism and means for preventing quick change of adjustment of said shaft from said last named adjustment to an adjustment wherein said door-locking means is released, to forestall operation of said shaft lock.

27. In combination, alarm mechanism including a shaft adjustable to a plurality of positions for controlling said mechanism, rigidly supported staggered lugs and a member moved by said shaft and cooperating therewith.

28. In combination, alarm mechanism including a shaft adjustable to a plurality of positions for controlling said mechanism and to a plurality of settings and having means for setting off said mechanism when moved to different adjustments at certain of said settings, a detent acting on said shaft and means requiring operation of said detent in moving said shaft from one adjustment to another and from one setting to another.

29. In combination, alarm mechanism including a shaft adjustable to a plurality of positions for controlling said mechanism and to a plurality of settings and having means for setting off said mechanism when moved to different adjustments at certain of said settings, a detent acting on said shaft and means requiring operation of said detent in moving said shaft from one setting to another to prevent feeling out the setting of said shaft.

30. In combination, alarm mechanism including a shaft adjustable to a plurality of positions for controlling said mechanism, rigidly supported staggered lugs, a member moved by said shaft and cooperating therewith, said shaft carrying correspondingly staggered depressions and a detent cooperating with said depressions.

31. In combination, a casing having a door provided with a locking member, alarm mechanism including a movable controlling part, means operated by said part and cooperating with said locking member to lock said door, and means operated by said alarm mechanism to restrain said locking means against operation to unlock said door.

32. In combination, a casing having a door provided with a locking member, alarm mechanism including a movable controlling part, means operated by said part and cooperating with said locking member to lock said door, and means operated by said alarm mechanism to restrain said locking means against operation to unlock said door and to release said locking means for operation to unlock said door at the termination of operation of said alarm mechanism.

33. In combination, a casing having a door, means for locking said door, alarm mechanism including a part movable in the operation of said alarm mechanism and means carried by said part for restraining operation of said locking means to unlock said door.

34. In combination, a casing, alarm mechanism therein and a member movable to adjust said mechanism to operative or inoperative condition and extending outside of said mechanism and comprising locking means, said member being susceptible of a plurality of settings in certain of which attempted movement to adjust said mechanism sets-off said mechanism.

35. In combination, alarm giving means, restraining means therefor and balance means for releasing said restraining means and including means for restraining operation of said balance means by shocks.

36. In combination, alarm giving means, restraining means therefor and balance means for releasing said restraining means and including means for restraining said balance means from operation when in a certain position.

37. In combination, alarm giving means, restraining means therefor and balance means for releasing said restraining means and including means for locking said balance means when in a certain position.

38. In combination, alarm giving means, restraining means therefor, balance means for releasing said restraining means and including a pivoted balance weight having a curved slot and a fixed lug accommodated by said slot during motion of said weight about its pivot.

39. In combination, alarm giving means, restraining means therefor, balance means for releasing said restraining means and including a swinging arm and a weight pivoted thereon and having a face curved differently from the normal path in which said arm swings on its pivot and a fixed lug cooperating with said face.

40. In combination, a casing having a door, first and second alarm means therein, means operated by said first alarm means to prevent opening of said door and by said second alarm means to permit opening of said door.

41. In combination, a casing having a door and a locking means therefor, alarm mechanism including a member movable to initiate operation of said mechanism and restrain operation of said locking means to open said door, the said mechanism subsequently moving said member to permit operation of said locking means.

42. In combination, a casing having a door and locking means therefor, an alarm device, said device operating locking means to prevent opening said door, and a second alarm device controlled by said first alarm device and operating said locking means to permit opening of said door.

43. In combination, a casing having a door provided with locking means, and alarm mechanism susceptible of a plurality of adjustments and including a controlling member therefor, susceptible of an adjustment to effect locking of said door, an adjustment wherein change of adjustment sets off said mechanism, and an adjustment wherein said mechanism may be automatically set off.

44. In combination, a casing having a door provided with locking means, and alarm mechanism susceptible of a plurality of adjustments and including a controlling member therefor, having an adjustable part and susceptible of an adjustment wherein said part may be adjusted, an adjustment to effect locking of said door, an adjustment wherein change of adjustment sets off said mechanism and an adjustment wherein said mechanism may be automatically set off.

45. In combination, a plurality of alarm operating plungers including a first plunger and a second plunger under tension and releasable upon operation of said first plunger and a third plunger releasable upon operation of said second plunger, and means for retarding motion of one of said plungers relatively to the other.

46. In combination, a container having a base upon which it is adapted to rest, a single lifting means for said container and attached thereto at a point at one side of a line passing vertically through the center of gravity of said container as it rests upon its base, and alarm mechanism attached to said container and operable upon change of vertical position of said container.

47. In a device of the class described, alarm mechanism, means for adjusting said mechanism to operative or inoperative condition and including a removable key and means for preventing removal of said key while said mechanism is adjusted to operative condition.

48. In combination, a container having a single lifting means and a base upon which it is normally adapted to rest, the plane of said base being positioned obliquely to a vertical line when said container is supported by said lifting means, and an alarm device attached to said container and operable upon change of vertical position of said container.

In testimony whereof, I have signed my name to this specification.

VLADIMIR P. FEDOROFF.